Jan. 19, 1965 L. ESSLINGER 3,166,630
REAR VISION CONSTRUCTION FOR TRACTOR-TRAILER
VEHICLES AND THE LIKE
Filed July 6, 1961 2 Sheets-Sheet 1
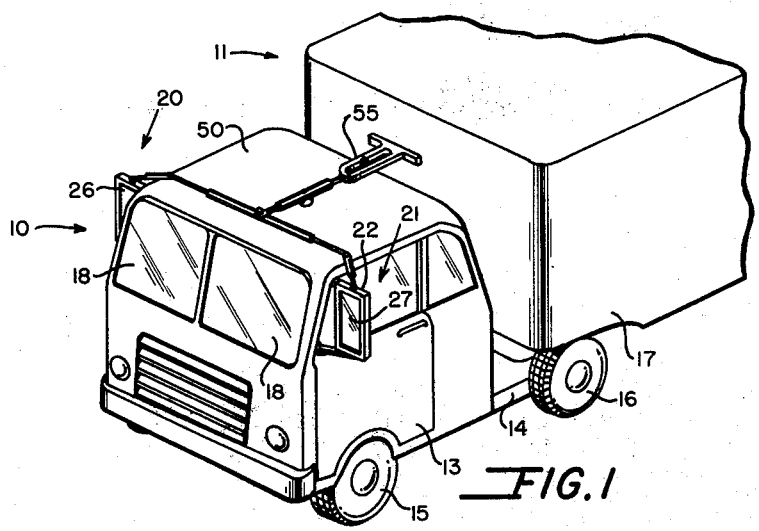
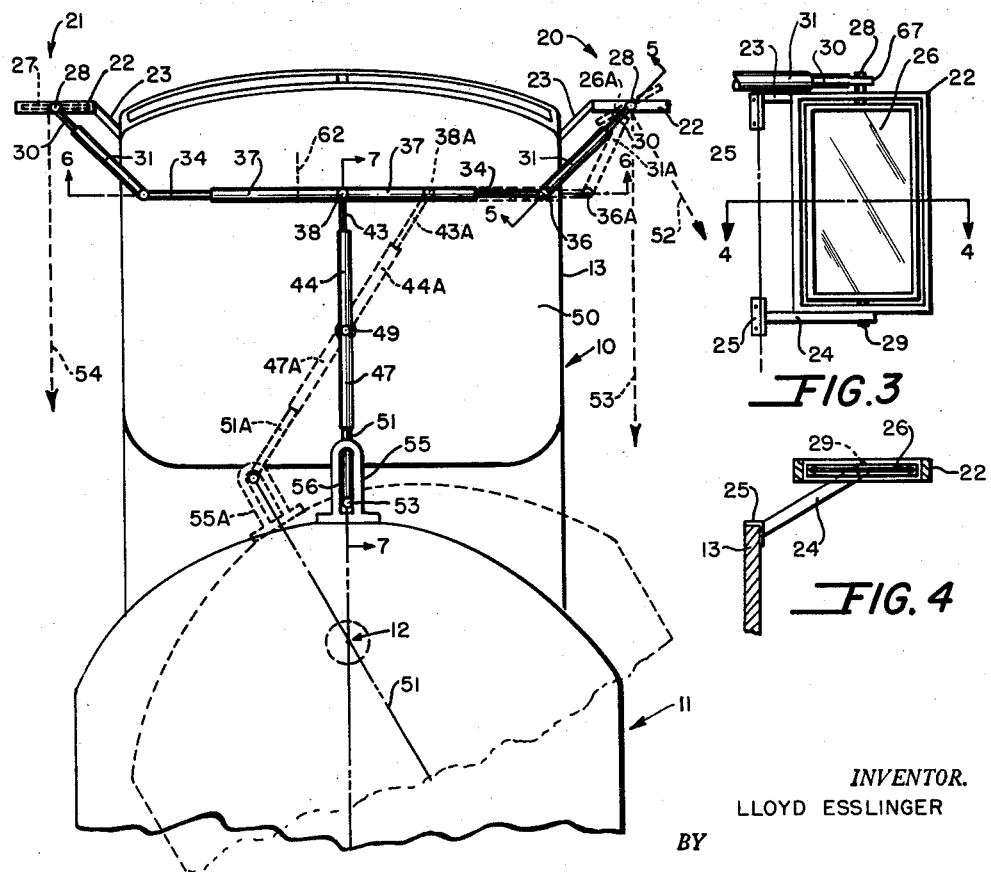
INVENTOR.
LLOYD ESSLINGER
BY
ATTORNEYS Jan. 19, 1965 L. ESSLINGER 3,166,630
REAR VISION CONSTRUCTION FOR TRACTOR-TRAILER
VEHICLES AND THE LIKE
Filed July 6, 1961 2 Sheets-Sheet 2
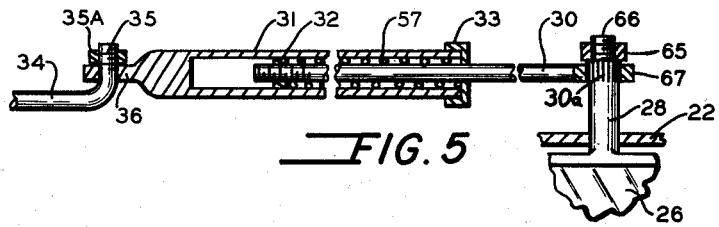
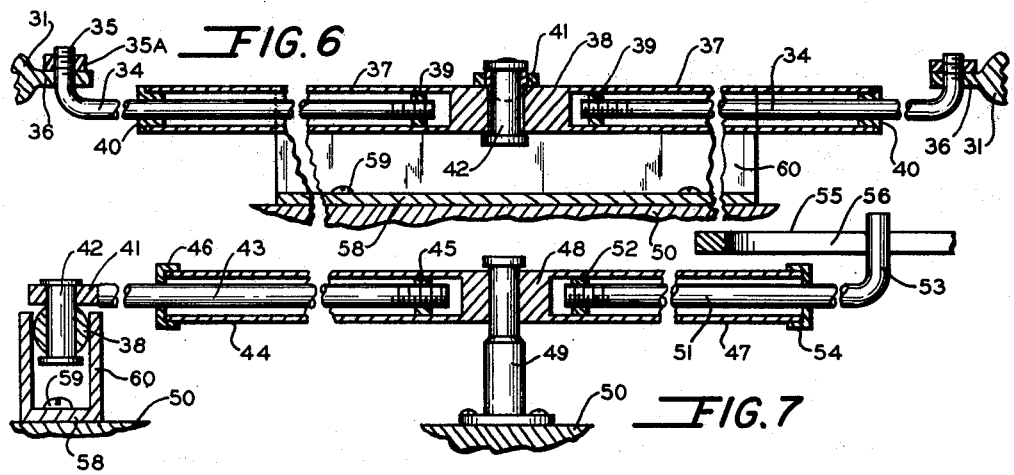
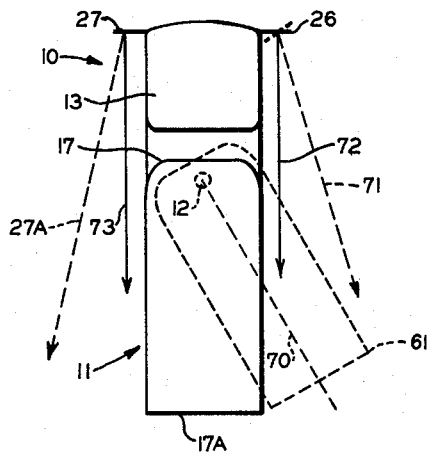
INVENTOR.
LLOYD ESSLINGER
BY
DesJardins, Robinson, Siller & Schenk
ATTORNEYS

United States Patent Office 3,166,630
Patented Jan. 19, 1965

3,166,630
REAR VISION CONSTRUCTION FOR TRACTOR-TRAILER VEHICLES AND THE LIKE
Lloyd Esslinger, 8544 Wuest Road, Cincinnati, Ohio
Filed July 6, 1961, Ser. No. 122,257
6 Claims. (Cl. 88—86)

This invention relates to rear vision constructions for tractor-trailer vehicles and the like.

Rear vision mirror constructions have been provided for tractor-trailer vehicles and the like, which heretofore have given the driver a limited rear view depending on the size and angle of the mirror. However, this view sometimes becomes obscured when the tractor and trailer hinge relatively to each other as the vehicle follows the curves of the road or is backed into a parking place or into a cross street or alley. For example, the usual hand adjustable right and left rear vision mirrors on the cab are generally adjusted by the driver by hand before the driving operation so he can see the road traffic to the rear of the vehicle on the straight runs of the road. However, when the vehicle is driven around curves in the road, or is being parked, etc., one or the other mirror view becomes obstructed by the hinging action between the tractor and trailer. The driver generally cannot adjust either mirror while operating the vehicle because he must concentrate on the manipulation of the steering wheel.

When the vehicle is to be backed into or out of a parking place, a cross street, an alley, or other place, these previous rear vision mirrors become even more ineffective. A clear rearward vision is necessary to avoid damage and to permit accurate backing movements required of the tractor-trailer vehicle. However, the sharp hinging movement of the trailer, with respect to the tractor, during such backing operations, completely obstructs the rear view of the particular rear vision mirror which is most needed.

According to this invention, on the other hand, a mirror construction is provided which automatically adjusts itself in response to the hinging actions of the trailer and tractor so a relatively clear rearward vision is provided where needed for the driver in the cab.

In one embodiment where right and left hand mirrors are provided on the cab, rightward turning or hinging movements cause the right mirror to be automatically adjusted to compensate for the rightward turn while the left mirror remains substantially unadjusted. Also, in a corresponding manner, a leftward turn causes the left mirror to be automatically adjusted to compensate for the left turn while the right mirror remains substantially unadjusted. This provides a very desirable adjustment of the mirrors.

Accordingly, one of the objects of this invention is to provide a rear vision mirror construction on a tractor-trailer vehicle and the like which has means automatically responsive to hinging movements of a tractor-trailer and the like to adjust such mirror construction to compensate for such hinging movements.

Another object of this invention is to provide a construction according to the foregoing object in which the mirror construction includes a rear vision mirror on one side of the tractor.

Another object of this invention is to provide a rear vision mirror construction in which rear vision mirrors are provided on both sides of the tractor which are adjusted automatically as desired in response to the hinging movements of the tractor-trailer.

Another object of this invention is to provide a vehicle construction having a cab with rear view mirrors on both sides of the cab and in which these mirrors are automatically adjusted in response to various hinging actions in the vehicle.

Further objects become apparent as the description proceeds with reference to the accompanying drawings in which:

FIGURE 1 is a front view, in perspective, of a portion of a tractor-trailer construction embodying this invention.

FIGURE 2 is a diagrammatic top view of a portion of FIGURE 1.

FIGURE 3 is a side elevation of the right-hand mirror construction of FIGURE 2.

FIGURE 4 is a horizontal cross section along the line 4—4 of FIGURE 3.

FIGURE 5 is a vertical cross section along the line 5—5 of FIGURE 2, in enlarged scale.

FIGURE 6 is a vertical cross section along the line 6—6 of FIGURE 2, in enlarged scale.

FIGURE 7 is a vertical cross section along the line 7—7 of FIGURE 2, in enlarged scale.

FIGURE 8 is a diagrammatic top view of pertinent parts of a typical tractor-trailer embodying this invention.

Certain terms are used indicating direction, such as forward, backward, front, rear, etc. It is to be understood, however, that these terms are used for the sake of brevity in description and without the intention of limiting the elements described by such words. It is to be understood that the elements may be in other positions and directions, as is obvious.

A tractor-trailer vehicle construction according to this invention includes a tractor 10 and a trailer 11 which are hingedly secured together to hinge relatively to each other about a vertical axis 12. The tractor 10 has a driver's cab 13 and a frame 14. The frame 14 has front and rear wheel constructions 15 and 16. The front end 17 of the trailer 11 is placed over and secured to the rear end of the frame 14 by any well known hinge construction, not shown, which permits the tractor and trailer to hinge relatively to each other about the vertical axis 12. The front of the trailer is supported by the wheel construction 16.

The trailer extends behind the tractor a relatively long distance where the rear 17A of the trailer is supported by its own well known rear wheel construction, not shown.

The trailer 11 is pulled behind the tractor 10 along the road and the driver in the cab 13 has a clear vision of the road in front through the front window or windows 18.

Rear vision mirror constructions have been provided which heretofore have given the driver in the cab 13 a limited view behind the vehicle. However, this view becomes obscured when the tractor and trailer hinge relatively to each other as the vehicle construction follows the curves of the road. The tractor generally is provided with the usual hand adjustable right and left rear vision mirrors. However, if these mirrors are adjusted so the driver can see the road traffic to the rear on the straight runs of the road, one or the other mirror view becomes obstructed by the trailer as the vehicle follows the curves of the road.

When the vehicle is to be backed into or out of a parking place, a cross road, an alley, or other place, these usual rear vision mirrors become even more ineffective at a time when a clear rearward vision is necessary to avoid damage and to permit the accurate backing movements required of such a vehicle.

According to this invention, on the other hand, a mirror construction is provided which automatically adjusts itself in response to the hinging actions of the trailer and tractor so a relatively clear rearward vision is provided for the driver in the cab.

For example, the mirror constructions shown in the drawings may include a right-hand mirror construction 20 and a left-hand mirror construction 21. These mirror constructions may be substantially similar or symmetrical to each other.

The mirror constructions 20 and 21 are automatically responsive to certain hinging movements about the hinge axis 12 to adjust such mirror constructions to compensate for such hinging movements. For this purpose linkage mechanism is connected to the mirrors, to the cab 13, and to the trailer 11 in a manner to adjust the mirror constructions 21 and 20 automatically in response to such hinging movements about the axis 12.

The mirror constructions 20 and 21 may include relatively stationary frames 22 that may be rigidly attached to the cab 13 by any suitable supports 23 and 24 which may be bolted or screwed by means of plates 25 to the sides of the cab 13.

The rear vision mirrors 26 and 27 are hinged within the frames 22 by means of the vertical shafts 28 and 29 which permit the mirrors 26 and 27 to be adjusted about the vertical axes of shafts 28 and 29.

The shaft 28 of each mirror 26 or 27 is fixedly secured to lever 30, so the corresponding mirror 26 or 27 may be adjusted by the swinging movement of the corresponding lever 30. A fluted construction 30a, FIGURE 5, is used so that a swinging movement of the corresponding lever 30 likewise swings the corresponding mirror 26 or 27, such as to the dotted line position 26A in FIGURE 2, or a corresponding position for mirror 27.

The levers 30 are automatically actuated or swung in response to the hinging movements of the tractor and trailer about the axis 12. To this end, the levers 30 are telescoped within the sleeve links 31. If desired, sliding washers 32 may be provided at the ends of the levers 30. Caps 33 may be threaded over the ends of the sleeves 31 to maintain the levers 30 in aligned condition with respect to the sleeves 31. These constructions permit air to flow freely past them, and no material air pumping action is produced.

The sleeves 31 are hingably secured to sliding rods 34, as by the hook 35, FIGURE 5, which engage the eyes 36 of sleeves 31. If desired, a suitable nut construction 35A may be provided at the hook 35 to insure that the hooks 35 do not fall out of the eyes 36.

The rods 34 telescope into the sleeves 37, FIGURE 6, which may be integrally aligned and joined to a central hub 38.

The rods 34 may be provided with sliding nut or washer constructions 39, and the ends of the sleeves 37 may be provided with internal caps 40 which may be internally threaded to the ends of the sleeves 37 in order to maintain the rods 34 in suitably aligned condition. No air pumping action is produced, and the washer construction 39 and caps 40 are loose enough to permit air freely to pass without any pumping action. The internal threaded construction of caps 40 is for a purpose later to become apparent.

The hub 38 may be connected to an eye 41 by means of a bolt or rivet 42, FIGURES 6 and 7. The eye 41 is part of a rod 43 which telescopes into the sleeve 44. The rod 43 may be provided with a sliding washer or nut 45 and with a cap construction 46 at the end of the sleeve 44 to maintain the rod 43 aligned to the sleeve 44. Likewise, no pumping action is contemplated to be produced by the washer 45 and cap 46.

Another sleeve 47 may be aligned and integral with the sleeve 44. The sleeves 44 and 47 may be integral with and joined by a solid hub 48. The hub 48 may pivot about a pin 49 which may be bolted or screwed to the roof 50 of the cab 13, so that the sleeves 44 and 47 may swing or pivot about the pin 49.

A rod 51 is telescoped within the sleeve 47 and is provided with a washer construction 52 at one end and with an upwardly bent hook 53 at the other end. A suitable cap 54 may be provided around the rod 51 and threaded to the sleeve 47. No pumping action is produced in sleeve 47.

A slotted construction 55 is secured to the front of the trailer 11 and receives the upward hook 53 within its slot 56. A hinging movement or pivoting movement between the tractor 10 and trailer 11 about the axis 12 causes the slot 56 to move the upward hook 53 rightward or leftward in FIGURE 2 and likewise causes the sleeves 44 and 47 to swing about the pin 49.

The straightforward position of the tractor 10 and trailer 11 is shown in full lines in FIGURES 2 and 8. The dotted line positions of certain parts in FIGURES 2 and 8 are intended to indicate the corresponding positions when the tractor 10 has made a right turn, or right hinging movement so that the trailer 11 trails at an angle, indicated by the axial line 70, which passes through the axis 12. This movement has caused the mirror 26 at the right of cab 13 to turn slightly counterclockwise to a position indicated by the numeral 26A, so that the driver's line of vision from the mirror 26 is along the line 52, which is so adjusted that it extends generally to the right rear corner 61 of the trailer 11. On the other hand, when the mirror 26 is in normal position, the line of vision for the driver extends in the general direction of the line 72, which extends along the right side of the trailer 11.

If desired, the construction may be such that the left mirror 27 is not materially affected during this right turning or hinging action, and the line of vision from the mirror 27 may continue to be substantially parallel to the side of the tractor 10, along the line 73, which may clear the front left corner of the tractor-trailer. Such action may be obtained by further details now to be described.

The adjustment of mirror 26 permits the driver to have a field of vision along the right rear corner 61 of the trailer. At the same time the unadjusted position of mirror 27 permits the driver to have a field of vision along line 73 so he can see traffic along the left side of the tractor.

A left turning or hinging movement of the tractor correspondingly adjusts mirror 27 and maintains mirror 26 in normal unadjusted position.

To cause the mirrors 26 and 27 to return to normal position, compression springs 57 may be interposed in the sleeves 31 between the washer 32 and the caps 33, to produce a centering action on the sleeves 31 and the rods 34.

To maintain the sleeves 37 and the rods 34 in proper transverse alignment over the roof 50 of the cab 13, a suitable channel member 58 may be placed under the sleeves 37 and hub 38 and may be bolted or screwed at 59 to the roof 50 of the cab 13. The sides 60 of the channel 58 may receive the sleeves 39 and the hub 38, to maintain the longitudinal movement of the sleeves 37 along the axis of the channel 58. The caps 40 on the sleeves 37 are internal caps, as shown, so that the sleeves 37 and caps 40 may slide freely between the sides 60 of the channel 58.

When the tractor 11 makes a right turning or hinging movement, then the sleeves 44 and 47 assume the dotted positions 44A and 47A, in FIGURE 2. This causes the sleeves 37 to move rightward, so that the hub 38 is then in the dotted position 38A. This in turn moves the right eye 36, FIGURE 2, to the dotted position 36A, which in turn moves the sleeve 31 to the dotted position 31A, which in turn moves the mirror 26 to the dotted position 26A. This directs the vision of the driver from the mirror 26A along the line 71 to a field near the rear right corner 61, FIGURE 8, of the trailer 11. This enables the driver to guide the vehicle in a manner to maintain the right corner 61 out of danger.

In the meantime, the left sleeve 37 has moved rightward, so its left end is at the plane 62. However, the spring 57 within the left sleeve 31 tends to prevent the sleeve 31 and rod 34 from moving rightward, although the sleeve 37 has moved rightward. The spring 57, which is a compression spring, tends to hold the sleeve 31 and rod 34 in their shortest combined length, as shown in full lines in FIGURE 2. Hence the mirror 27 is not materially moved from its normal position during the right turn of the tractor 10, and the line of vision is maintained along line 73.

When the tractor 10 makes a left turning or hinging movement, then the mirror 27 is changed in a manner symmetrical with respect to mirror 26A, to direct the driver's vision along the line 27A, FIGURE 8, and the mirror 26 is then maintained in normal position, to maintain the driver's vision along line 72 by a similar action, as is apparent.

In brief, when the tractor 10 has made a right turning or hinging movement with respect to the trailer 11, then mirror 26 directs the driver's vision along line 71 while the mirror 27 directs his vision along line 73. When the tractor makes a left hinging movement, mirror 27 directs his vision along line 27A and the mirror 26 directs his vision along line 72. These are the most desirable lines of vision for these right and left hinging movements.

The mirrors 26 and 27 may be initially adjusted while the vehicle is stationary and in straight line position. This adjustment is such that the driver in the cab 13 has normal rearward vision along the lines 72 and 73, so that he may see the traffic on both sides of the trailer 11 during the straight runs. The mirrors 26 and 27 may be adjusted for these positions by removing the corresponding nut 65 from the threaded extension 66 of the vertical shaft 28. The corresponding eye 67 of the corresponding rod 30 may be lifted, so that either of the mirrors 26 and 27 may be adjusted with respect to their respective rod 30, until such mirrors produce the desired rear vision indicated by the lines 72 and 73. Then the eyes 67 of the corresponding rods 30 are placed over the fluting 31, and the respective nut 65 may be replaced on the threaded extensions 66.

It is thus to be seen that a construction has been provided to produce a compensating adjustment of the rear vision mirror constructions of a tractor-trailer or the like, in response to hinging actions which take place in such a vehicle or the like.

While the form of the invention now preferred has been disclosed as required by the statues, other forms may be used, all coming within the scope of the claims which follow.

What is claimed is:

1. A tractor-trailer vehicle construction comprising a tractor, a trailer hingedly secured behind said tractor for hinging movements relatively to said tractor, a rear vision mirror construction on said tractor, and means connected between said tractor and trailer automatically responsive to said hinging movements between said tractor and trailer to adjust said mirror construction to compensate for said hinging movements.

2. A tractor-trailer vehicle construction comprising a tractor, a trailer hingedly secured behind said tractor for hinging movements relatively to said tractor, a rear vision mirror on one side of said tractor, and means operatively connected between said tractor and trailer automatically responsive to said hinging movements between said tractor and trailer to adjust said mirror to compensate for said hinging movements.

3. A tractor-trailer vehicle construction comprising a tractor, a trailer hingedly secured behind said tractor for hinging movements relatively to said tractor, a rear vision mirror on one side of said tractor, a rear vision mirror on the other side of said tractor, and means operatively connected between said tractor and trailer automatically responsive to said hinging movements between said tractor and trailer to adjust said mirrors to compensate for said hinging movements.

4. A vehicle construction having a tractor with a cab, a trailer hingedly secured behind said tractor for hinging movements relatively to said tractor, rear vision mirrors respectively on each side of said cab, and linkage mechanism connected to said mirrors and operatively connected between said cab and trailer to adjust said mirrors in response to said hinging movements.

5. A vehicle construction comprising a tractor, a cab on said tractor with a roof, a trailer hingedly secured behind said tractor, a first pair of aligned sleeve and rod constructions pivoted on said roof and normally positioned in a front and rear direction, one of said rods being pivotally secured to said trailer to be pivoted in response to turning movements of said vehicle, a second pair of sleeve and rod constructions movable over said roof in a substantially transverse direction by the other rod of said first pair of sleeve and rod constructions, right and left rear vision mirrors adjustably secured on the right and left sides of said cab respectively, and right and left sleeve and lever constructions secured to respective rods of said sleeve and rod constructions of said second pair to adjust said mirrors in response to hinging movements of said vehicle.

6. A construction according to claim 5 in which said right mirror is adjusted by a right hinging movement of said vehicle while said left mirror is not materially adjusted during said right hinging movement and in which said left mirror is adjusted by a left hinging movement of said vehicle while said right mirror is not materially adjusted during said right hinging movement.

References Cited in the file of this patent
UNITED STATES PATENTS

| | | |
|---|---|---|
| 2,854,892 | Stark | Oct. 7, 1958 |
| 2,988,957 | Kotora | June 20, 1961 |